Dec. 6, 1932.  L. B. SWIFT  1,890,006
SANITARY FITTING FOR INDUSTRIAL THERMOMETERS
Filed Feb. 23, 1929
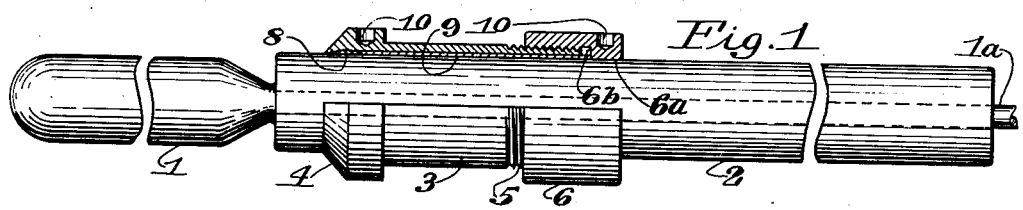
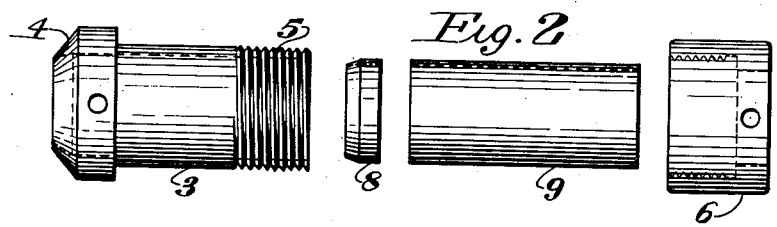
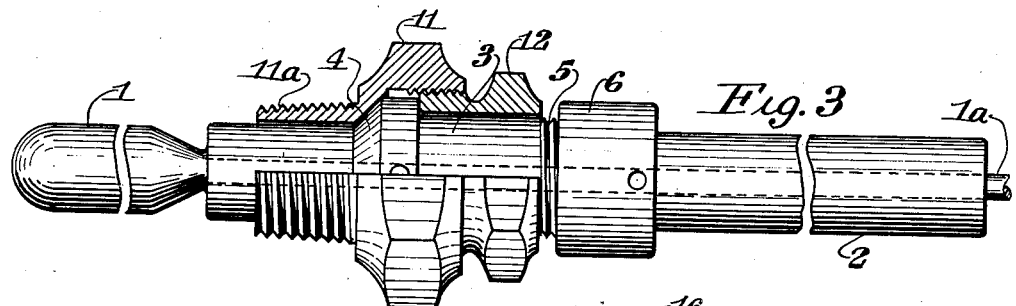
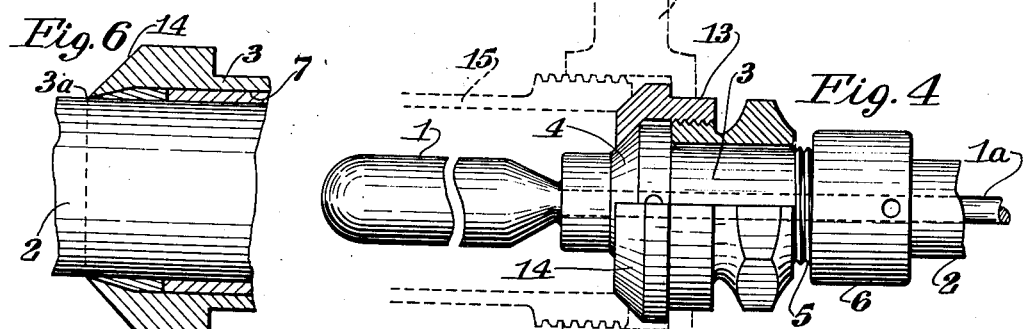
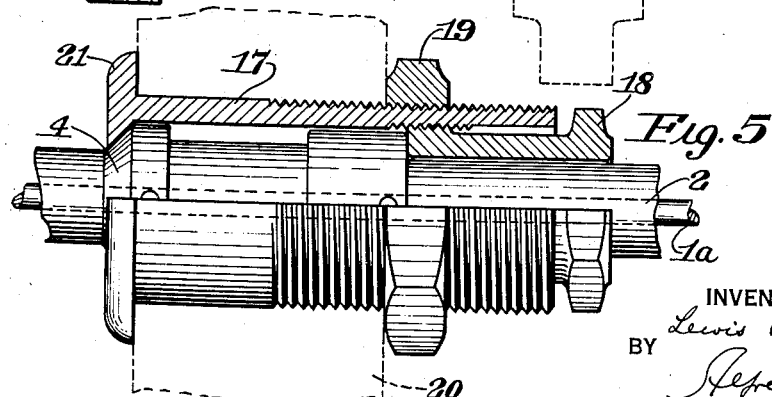
INVENTOR:
Lewis B. Swift
BY
Alfred Burger
ATTORNEY Patented Dec. 6, 1932

1,890,006

UNITED STATES PATENT OFFICE

LEWIS B. SWIFT, OF ROCHESTER, NEW YORK, ASSIGNOR TO TAYLOR INSTRUMENT COMPANIES, OF ROCHESTER, NEW YORK, A CORPORATION OF NEW YORK

SANITARY FITTING FOR INDUSTRIAL THERMOMETERS

Application filed February 23, 1929. Serial No. 341,943.

This invention relates to fittings for industrial thermometers of the type used for controlling the pasteurization of milk or the like and more in particular to thermometers of the type shown and described in the Patents #1,233,385 and 1,609,606.

In milk pasteurization great stress has been laid upon arrangements whereby milk is prevented from coming into contact with any parts of the thermometric device except the bulb containing the thermometric fluid.

It is the object of the present invention to provide a sanitary fitting of the character referred to, which with small changes may be applied to a large number of special applications.

For a full understanding of the invention, reference is made to the accompanying drawing, wherein:

Fig. 1 is a view partly in elevation and partly in section showing an embodiment of the invention;

Fig. 2 is an elevation of the details forming part of the invention;

Fig. 3 is a view partly in elevation and partly in section showing one application of the invention;

Figs. 4 and 5 are similar views showing other applications of the invention; and Fig. 6 is a fragmentary sectional view of the arrangement shown in Fig. 1.

In Fig. 1, 1 represents a metallic bulb for the reception of thermometric indicating fluid such as mercury or the like and 2 is a stem connected to the bulb in the usual way to serve as a support for the bulb 1, the capillary 1a and for connections with a container into which the bulb is to be projected.

The invention proper includes an adapter body or tubular element 3 having at one end a conical seat 4 and at the opposite end a screw thread 5 engaged by a nut-like member 6. The interior surface of the tubular element comprises a substantially cylindrical portion 7 extending from the screw-threaded end to near the end carrying the seat 4 and an approximately converging conical portion continuing from the cylindrical portion to the end of the tubular element. The tubular element 3 is passed over the stem 2 with the seat 4 facing the bulb 1. A compression ring 8 of relatively soft, malleable metal such as tin, brass or the like is moved into the space between the tubular element 3 and the stem 2 and is forced into the conical space at the end adjacent the seat. This compression ring is pre-formed to approximately fit the conical space referred to and has a sharp edge tending to readily wedge itself into the small clearance between the stem 2 and the seat. In back of the compression ring is a gland portion 9 which may be integral with the ring 8, if they are of the same material.

The combined length of the compression ring 8 and the gland 9 is greater than the length of the tubular element 3. The gland thus projects from the threaded end of the tubular element and is acted upon to force the compression ring into sealing position. To this end the member 6 has an axial opening 6a closely fitting the stem 2, thereby defining a shoulder 6b which acts as an abutment against the projecting end of the gland 9. As the nut-like member 6 is screwed up on the tubular element 3, the gland is advanced to apply pressure upon the compression ring 8.

The compression ring 8 being accurately pre-formed to substantially fit into the conical space mentioned, a relatively small movement by means of nut 6 is sufficient to provide a fluid-tight seal. The inner and outer surfaces of the ring are simultaneously forced over their whole area into intimate and uniform contact with the corresponding surfaces of the stem and the tubular element respectively and the edge of the ring forms an effective seal against ingress of liquid. The clearance between the edge 3a of the seat 4 and the stem 2 is so small that it would require a tremendous pressure to extrude the metal of the ring through it. The clearances between the gland 9 and the corresponding walls of the tubular member 3 and the stem 1 respectively are likewise negligible as they are just sufficient to permit movement of the gland. The material of the ring 8 is thus confined in a practically completely confined space and when subjected to the compression pressure of the gland, is forced into contact with the walls of the stem 2 and the tubular element 3, so as to effectively preclude the passage of fluid past the edge 3a of the seat 4.

When the pressure upon the ring 8 is released, i. e., when the member 6 is partly unscrewed, the tubular body 3 may be more or less readily shifted along the stem. This is due principally to the fact that the surface of stem is very smooth and no appreciable deformation of the compression ring or permanent interlocking thereof with depressions in the stem can take place.

To facilitate the application of the device, the tubular element 3 and the nut member 6 are provided with holes 10 for spanner wrenches. One wrench is used to hold the tubular element stationary while another is used to screw up the member 6.

The significance of the invention just described will appear in connection with the applications illustrated in Figs. 3-5.

In Fig. 3, the device just described is associated with a ferrule 11 and a nut-like member 12. The ferrule 11 includes a seat for co-operation with the seat 4 and a screw-threaded nipple 11a by which the device as a whole may be attached to a boiler, tank or other container. To apply the fittings 11 and 12, the member 6 is first removed to permit the nut member 12 to enter over the tubular element. Then the ferrule 11 is attached. The latter has screw-thread connection with the member 12 so that the ferrule 11 may be tightly drawn against the seat 4.

In Fig. 4 the arrangement and disposition of the parts is generally the same as in Fig. 3, with the difference that the seat 4 is associated with a ferrule 13 which is provided on the one hand, with a seat cooperating with the seat 4 and, on the other hand, with a seat for cooperation with a corresponding seat on a pipe line 15, a coupling nut 16 being used to effect the union between the ferrule 13 and the pipe line 15.

In Fig. 5 the arrangement shown in Fig. 1 is associated with a sleeve member 17 having a seat for cooperation with the seat 4, a ferrule 18 for forcing the sleeve member against the seat 4 and a nut 19 for holding the sleeve in fixed position in the wall 20 of a tank, vat or the like. The member 17 has an interior screw thread for engagement by the ferrule 18 and an external screw thread for engagement by the nut 19. The sleeve member has at the end provided with the seat, a flange 21 to be drawn up tight against the wall of the tank by means of the nut 19.

The three applications described represent only some of the principal uses. The practical significance of the invention is this:

There are many instances, especially in connection with the pasteurization of milk, where no screw thread or other like joint is allowed to come into contact with the milk or other liquid and a mechanically tight seal such as represented by the seat 4 and the corresponding seat of a cooperating element must be employed. According to the character of the milk container to which the bulb 1 and its fluid transmission system must be attached and according to the distance of the bulb to be placed in each particular case from the point of attachment, special fittings must be made for different applications. The seat 4 must be disposed at a definite point along the stem 3 and it must have a definite diameter to suit a particular requirement.

By means of the invention described, the thermometer manufacturer may provide a single standard equipment consisting of the arrangement shown in Fig. 1 and the user of the thermometer, usually a manufacturer of pasteurizing or other industrial equipment, may furnish his own standard connections, such as described in Figs. 3, 4 and 5 for co-operation with the standard arrangement furnished by the thermometer manufacturer. The adjustment may be made as desired in each particular case. The tubular element may be moved up to the desired position and then locked in place by means of spanner wrenches applied to holes 10 whereby the fluid tight seal is effected after the correct adjustment has been made. A fluid-tight connection, such as described in the patents referred to, may be made in a large number of totally different structures without special fittings for each case. The basic arrangement including tubular connection 3, compression ring 8 and gland 9, as a unit or separately as the case may be and the compressing nut 6 is so disposed that its largest diameter is no larger than the outside diameter of seat 4 and thus does not take up more room than would be substantially required by a seat 4 fixed on a stem 3. The nut member 6, due to its small size and its position relatively to the seat 4, permits the association of any other form of connecting member required to complete the connection.

I claim:

1. A sanitary fitting for a thermometer stem or the like, an adapter body at one end thereof having an external conical seat to form a part of a sanitary joint, merging into a shoulder, said body having an internal diameter larger than that of the stem to form an interspace between the latter and the interior surface of the body, said interspace narrowing down to approximately the diameter of the stem, substantially at the face of the seat, a compression ring tapering toward one edge and disposed in said interspace with its tapering edge directed toward the narrow end of said interspace, and means engaging the compression ring to force it into the narrow portion of the interspace.

2. A sanitary fitting for a thermometer stem, conduit or the like, an adapter body defining an external conical seat at one end thereof, said seat being adapted to form a part of a sanitary joint, said body having an internal diameter larger than that of the stem and gradually narrowing down to the diameter of the latter substantially at said seat, a compression ring tapering toward one edge and disposed in the space between the body and the stem with the thinner end directed toward the narrow end of the interspace, and means disposed at the end of the body opposite the seat for axially pressing upon said compression ring, including a screw thread on one surface of the body and a threaded member engaging said screw thread for axial movement along the body to exert pressure upon the compression ring.

3. A fitting for a stem or pipe, a tubular element having at one end an outward enlargement, said enlargement defining an external beveled seat adapted to form a part of a sanitary joint and rearwardly of said seat a shoulder, the other end of the tubular element being provided with a screw thread, the interior surface of the tubular element defining a cylindrical portion and a conical portion converging from the cylindrical portion to substantially the diameter of the stem substantially at the seat, a compression ring having a tapered portion at one end, said ring being movable through said cylindrical space, a nut-like member for engagement with said screw thread, and means including said nut-like member contacting said compression ring to force its tapered portion into the conical space of the tubular element.

4. A fitting for a thermometer stem or the like, a tubular element on the stem, said tubular element being provided with an external valve seat at one end and having an internal diameter larger than that of the stem to form an interspace between the tubular element and the stem, said interspace narrowing at said end to substantially the diameter of the stem whereby the tubular element terminates at the said end in a relatively sharp edge around the stem, a tubular member shaped to fill the narrowing portion of said interspace and terminating in a sharp edge having substantially the diameter of the stem, and means for forcing said tubular member into the narrowing portion of said interspace whereby a sanitary joint is made between the stem and said tubular member.

5. A fitting for a thermometer stem or pipe, a tubular element on said stem, said element having an external beveled end and having an internal diameter larger than that of the stem to form an interspace between the tubular element and the stem, said interspace including a cylindrical portion and a conical portion narrowing from the cylindrical portion to substantially the diameter of the stem at said end of the tubular element whereby said tubular element terminates in a relatively sharp edge, a tubular member having a conical portion dimensioned to fill the conical portion of said interspace and terminating in a sharp edge having substantially the diameter of the stem, and means for forcing said tubular member into the conical portion of said interspace to provide a sanitary joint between said stem and the tubular element.

In testimony whereof I affix my signature.

LEWIS B. SWIFT.